US008625295B2

(12) United States Patent
Alley et al.

(10) Patent No.: US 8,625,295 B2
(45) Date of Patent: Jan. 7, 2014

(54) FIELDBUS INTERFACE CIRCUIT BOARD SUPPORTING MULTIPLE INTERFACE TYPES AND TERMINATIONS

(75) Inventors: Daniel Milton Alley, Earlysville, VA (US); Longhui Shen, ShangHai (CN); Ye Xu, ShangHai (CN)

(73) Assignee: General Electric Company, Schenectady, NY (US)

( * ) Notice: Subject to any disclaimer, the term of this patent is extended or adjusted under 35 U.S.C. 154(b) by 233 days.

(21) Appl. No.: 13/012,376

(22) Filed: Jan. 24, 2011

(65) Prior Publication Data
US 2012/0188731 A1    Jul. 26, 2012

(51) Int. Cl.
*H05K 7/00*    (2006.01)

(52) U.S. Cl.
USPC ........... 361/760; 361/775; 361/788; 361/800; 710/300; 710/302; 710/303; 710/304; 710/305

(58) Field of Classification Search
USPC ......................................................... 361/760
See application file for complete search history.

(56) References Cited

U.S. PATENT DOCUMENTS

| | | | |
|---|---|---|---|
| 4,124,889 A * | 11/1978 | Kaufman et al. ................. | 710/2 |
| 6,301,633 B1 * | 10/2001 | Chapman ...................... | 710/305 |
| 6,740,821 B1 | 5/2004 | Jiang et al. | |
| 6,936,775 B2 | 8/2005 | Jiang et al. | |
| 7,245,501 B2 | 7/2007 | Kotson et al. | |
| 7,246,194 B2 * | 7/2007 | Train et al. .................... | 710/311 |
| 7,447,612 B2 * | 11/2008 | Keyes et al. ................... | 702/188 |
| 7,715,433 B2 * | 5/2010 | Boren ........................... | 370/466 |
| 7,802,023 B2 | 9/2010 | Yamazaki et al. | |
| 2003/0236937 A1 | 12/2003 | Barros De Almeida et al. | |
| 2005/0258535 A1 | 11/2005 | Jiang et al. | |
| 2007/0195510 A1 | 8/2007 | Kotson et al. | |
| 2008/0013569 A1 * | 1/2008 | Boren ........................... | 370/466 |
| 2008/0065805 A1 * | 3/2008 | Wu et al. ....................... | 710/301 |
| 2009/0282437 A1 * | 11/2009 | Malec et al. .................... | 725/40 |

OTHER PUBLICATIONS

European Search Report for corresponding EP Application No. 12150538.2-1953/2479678, dated Aug. 13, 2013, pp. 1-8.

* cited by examiner

*Primary Examiner* — Tuan T Dinh
*Assistant Examiner* — Mukund G Patel
(74) *Attorney, Agent, or Firm* — Cantor Colburn LLP

(57) ABSTRACT

An interface circuit board apparatus can include a shared circuit board base, a transceiver section disposed on the circuit board base, and having circuit transceiver sites configured to receive a plurality of transceiver component types, a termination section disposed on the circuit board base, and having circuit termination sites configured to receive a plurality of termination component types, and a connection section operatively coupled to the transceiver and termination sections, wherein the transceiver section, the termination section and the connection section are configurable to support a plurality of interface types based on the plurality of transceiver component types and the plurality of termination component types.

18 Claims, 3 Drawing Sheets

FIG. 2

| Male DB9 Pin Number | Equiv. Female Pin Number | CANBUS Circuit | PROFIBUS Circuit | FF H1 BUS Circuit |
|---|---|---|---|---|
| 1 | 5 | n/c | DGND | n/c |
| 2 | 4 | CAN_L | n/c | n/c |
| 3 | 3 | n/c | DATA+ | n/c |
| 4 | 2 | n/c | n/c | n/c |
| 5 | 1 | SHIELD | n/c | n/c |
| 6 | 9 | GND | n/c | DATA+ |
| 7 | 8 | CAN_H | DATA- | DATA- |
| 8 | 7 | n/c | n/c | n/c |
| 9 | 6 | n/c | n/c | n/c |
| Module Connector Gender | | Male | Female | Male |

FIELDBUS INTERFACE CIRCUIT BOARD SUPPORTING MULTIPLE INTERFACE TYPES AND TERMINATIONS

BACKGROUND OF THE INVENTION

The subject matter disclosed herein relates to bus interfaces, and more particularly to an interface circuit board supporting multiple interface types.

Currently, there are numerous connector interfaces such as serial bus and fieldbus. Different instrumentation may require different interfaces. As such, control systems such as computers can include several different interfaces, which can take up limited hardware space on the control system. However, current instrumentation typically implements a limited number of interface types including process field bus (PROFIBUS), controller-area network bus (CANBUS), and foundation fieldbus (H1 FF). Even with a limited number of interface types, limited hardware space can still be crowded with multiple interfaces. In one attempt to reduce hardware space used, manufacturers have implemented external daughter boards, where each specific type of interface had a separate circuit board, which can reduce the hardware space used. The main control circuit board would then have one of the optional interface daughter boards installed at the time of manufacturing.

Although multiple interfaces could all co-exist with separate connectors, more board area is required for extra parts and connectors, in addition to increasing costs due to the extra parts. In addition, since the multiple interfaces would not be used at the same time, the device becomes more expensive and larger than desired. In other attempts to reduce the amount of hardware space used, termination selections have used switches to connect or disconnect the termination array of resistors. But this solution requires the user to locate and set the switch based on the location of the device along the bus.

BRIEF DESCRIPTION OF THE INVENTION

According to one aspect of the invention, an interface circuit board apparatus is described. The interface circuit board apparatus can include a shared circuit board base, a transceiver section disposed on the circuit board base, and having circuit transceiver sites configured to receive a plurality of transceiver component types, a termination section disposed on the circuit board base, and having circuit termination sites configured to receive a plurality of termination component types and a connection section operatively coupled to the transceiver and termination sections, wherein the transceiver section, the termination section and the connection section are configurable to support a plurality of interface types based on the plurality of transceiver component types and the plurality of termination component types.

According to another aspect of the invention, a fieldbus interface circuit board system is described. The fieldbus interface circuit board can include a shared circuit board base, including a transceiver section disposed on the circuit board base, and having circuit transceiver sites configured to receive a plurality of transceiver component types, a termination section disposed on the circuit board base, and having circuit termination sites configured to receive a plurality of termination component types, a connection section operatively coupled to the transceiver and termination sections and a controller operatively coupled to the circuit board base and having instructions to implement signals and protocols for a plurality of interface types.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 illustrates a table of a pinout and selection of gender of a connector in accordance with exemplary embodiments.

The detailed description explains embodiments of the invention, together with advantages and features, by way of example with reference to the drawings.

DETAILED DESCRIPTION OF THE INVENTION

Figure 1:
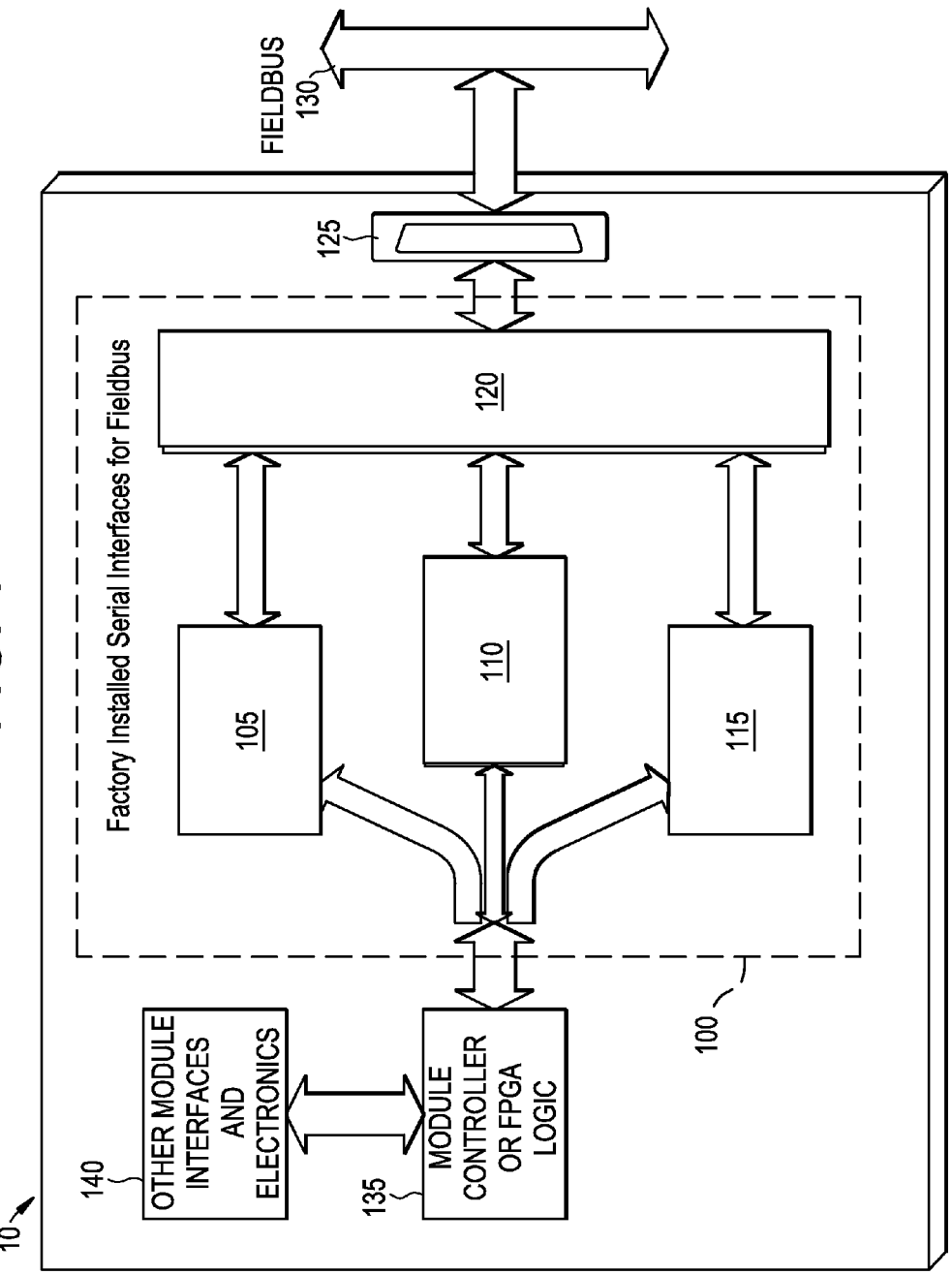
FIG. 1 illustrates a block diagram of a system including an exemplary interface circuit board supporting multiple interface types.

FIG. 1 illustrates a block diagram of a system 10 including an exemplary interface circuit board 100 supporting multiple interface types. As described herein, electronic systems contain many types of interfaces, and similar systems differ only in the type of serial interface provided at a connector. For example control modules lack enough size to support multiple connectors forcing different module types for each specific interface style such as separate models for PROFIBUS, CANBUS, and H1 FF. PROFIBUS, CANBUS, and H1 FF all use the same connector style. For example, the connector style can be but is not limited to DB9, RJ, DIN and terminal strip. For illustrative purposes, a DB9 style connector is described herein. As illustrated in FIG. 2, the interface styles, PROFIBUS, CANBUS, and H1 FF use the same connector style, differing in the pinout and gender (male plug or female socket) as illustrated in FIG. 2. In exemplary embodiments, the systems described herein implement a common circuit board base layout such that the parts installed on the circuit board vary among the interface types while allowing a high volume of use for the bare circuit board for a lower cost per board.

Although PROFIBUS, CANBUS, and H1 FF are discussed as three interface types that can co-exist and be manufactured on the circuit board 100, it will be appreciated that other types of interfaces are contemplated in other exemplary embodiments. As such, PROFIBUS, CANBUS, and H1 FF are discussed for illustrative purposes only.

The exemplary circuit board 100 can include several sections 105, 110, 115, 120 that can all co-exist on the circuit board and be advantageously configured at the time of manufacture to function as one of the interface types (e.g., PROFIBUS, CANBUS, and H1 FF). A first transceiver section 105 can be configured for PROFIBUS AND H1 FF transceivers can include an optional RS485 half duplex transceiver whose output is also coupled to a termination section 110. The circuit board 100 can further include a second transceiver section 115 configured for a CANBUS interface and transceiver, which is also connected to the termination section 110. The first and second transceiver sections 105, 115 and the termination circuit are further coupled to a then through a matrix section 120 of jumpers (e.g., zero ohm resistors) to a connection section 125 for a DB9 connector. As shown in the table 200 of FIG. 2, and described further herein, the pinout and selection of gender of the DB9 connector can be determined and set at the time of manufacture when it is determined what type of interface is to be set on the circuit board 100. The DB9 connector can then be coupled to a fieldbus 130 of the system 10. Those skilled in the art appreciate that each of the multiple interface types having a unique signal mapping to the DB9 connector. In exemplary embodiments, the matrix section 120 is configured to support each of the unique signal mappings.

In exemplary embodiments, control of the interface of the circuit board 100 is by a set of shared signals from the logic and/or FPGA controller section 135 of the system 10, with the signals assigned different functions based on the selected interface installed on the board. For example, the firmware loaded by the manufacture into the controller section can determine the signals and protocols implemented for the interface type. In exemplary embodiments, the controller section 135 can be Ethernet based. The controller section 135 can be further coupled to other interfaces/electronics 140 in the system 10.

As described herein, the manufacturer selects the specific parts to be installed for the desired interface based on the bill of material, where specific parts including integrated circuits, resistors, and other components are added or removed based on the interface type.

As such, the exemplary circuit board 100 provides a fieldbus 130 interface within a larger system 10 and supports one of multiple types of protocols and connections, where the type of protocol (e.g., PROFIBUS, CANBUS, and H1 FF) is selected at the time of manufacturing the interface through selection of installed components on the interface's circuit board 100. Connections are via a common shared connector style (e.g., DB9), with manufacturing component selection further implemented to assign specific connector pins to interface functions. Operation of the interface is via connections to the rest of the circuit board's system 10, where the connections have different function based on the installed interface. The fieldbus interface circuit board 100 further supports an internally controlled termination network (e.g., the termination section 110), such that the module containing this circuit board and interface may be installed anywhere along the interface bus with no additional terminations required.

Figure 3:
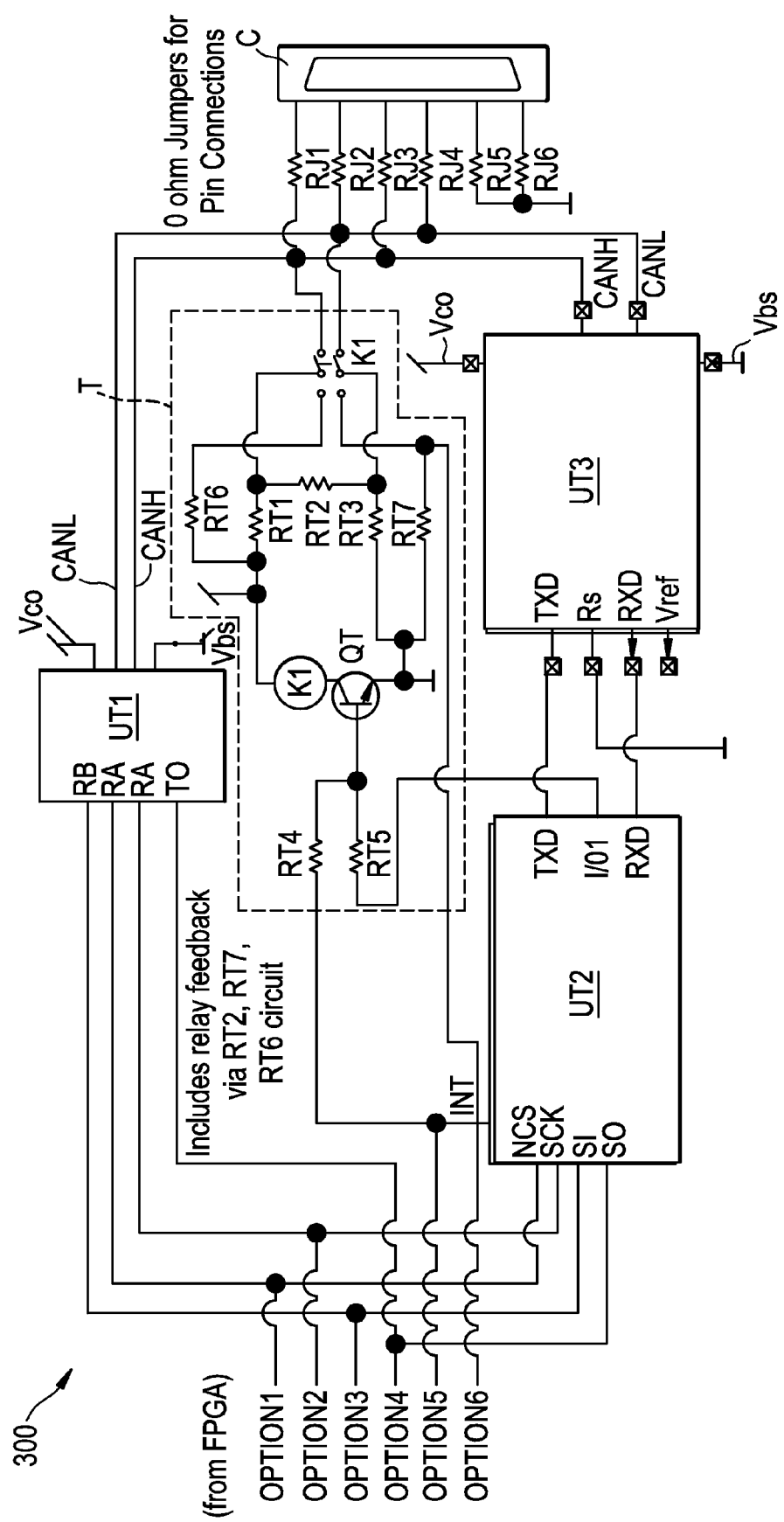
FIG. 3 illustrates a circuit diagram of an exemplary circuit in which the multiple interface types and respective parts can be selected at the time of manufacturing in accordance with exemplary embodiments.

FIG. 3 illustrates a circuit diagram of an exemplary circuit 300 in which the PROFIBUS, CANBUS, and H1 FF and respective parts are selected at the time of manufacturing. The circuit 300 includes three transceiver sections UT1, UT2, UT3 as described herein. The layout further includes a termination section T that includes resistors RT1, RT2, RT3, RT4, RT5, RT6, RT7, relay K1 and transistor QT. The circuit 300 further includes FPGA input lines OPTION1, OPTION2, OPTION3, OPTION4, OPTION5, OPTION6. The layout further includes output lines RJ1, RJ2, RJ3, RJ4, RJ5, RJ6 (e.g., 0 ohm jumpers) as a jumper matrix to interface with the external connector C (e.g., a DB9 connector as described herein).

As described herein, the circuit 300 includes component sections that can be configured at the time of manufacture to be one of several interface such as but not limited to one of PROFIBUS, CANBUS, and H1 FF as now described.

For PROFIBUS, UT1, RT1, RT3, RT3, RT4, RT6, RT7, QT, K1 are installed on the circuit 300. In addition, a female DB9 connector is installed in the connector section C. Jumpers RJ1, RJ3 are connected such that the UTI active high output (CANH) is connected to connector pin 3 of the female DB9 (See FIG. 2). Jumpers RJ2, RJ4 are connected such that the active low output (signal CANL) goes to connector pin 8 of the female DB9 connector (See FIG. 2). Jumpers RJ5, RJ6 are connected such that common signal of UT1 goes to pin 5 of the DB9 connector (See FIG. 2). For the PROFIBUS, UT2, UT3, and RT5 are not installed. Signals for the controller are OPTION1 for receiver active, RA, OPTION2 for transmit enable, TE, OPTION3 for receiver back, RB, OPTION4 for transmit out, TA, OPTION5 for termination control, and OPTION6 for relay feedback from the termination section T via the transistor QT and relay K1. UT1 inputs further include a floating supply voltage $V_{BS}$ and a control voltage $V_{CO}$.

For H1 FF, UT1, RT1, RT2, RT3 RT4, RT6, RT7, QT, K1 are installed on the circuit 300. In addition, a male DB9 connector is connected in the connector section C. Jumpers RJ1, RJ3 are connected such that the UTI active high output (CANH) is connected to the connector pin 6 of the DB9 male connector (See FIG. 2). Jumpers RJ2, RJ4 are connected such that the active low output (signal CANL) goes to connector pin 7 of the male DB9 connector (See FIG. 2). For the H1 FF, UT2, UT3, and RT5 are not installed. Signals for the controller are OPTION1 for receiver active, OPTION2 for transmit enable, OPTION3 for receiver back, OPTION4 for transmit out, OPTION5 for termination control, and OPTION6 for relay feedback from the termination section T via the transistor QT and relay K1. UT1 inputs further include a floating supply voltage $V_{BS}$ and a control voltage $V_{CO}$.

For CANBUS, UT2, UT3, RT2, RT5, RT6, RT7, Q1, K1 are installed on the circuit 300. In addition and a male DB9 connector is connected in the connection section C. Jumpers RJ1, RJ3 are connected such that the UT3 active high output (CANH) is connected to the connector pin 7 of the DB9 male connector (See FIG. 2). Jumpers RJ2, RJ4 are connected such that the active low output (signal CANL) goes to connector pins 5 and 6 of the male DB9 connector (See FIG. 2). For CANBUS, UT1, RT1, RT3, RT5 are not installed. Signals for the controller are OPTION1 for select, OPTION2 for clock, OPTION3 for data to CAN, OPTION4 for data from CAN, OPTION5 for CAN interrupt, and OPTION6 for relay feedback from the termination section T via the transistor QT and relay K1.

Control of the interfaces similarly varies with interface type. As described herein For PROFIBUS and H1 FF, the transceiver section UT1 can be a RS485 transceiver as illustrated in FIG. 3. As such, PROFIBUS and H1 FF both rely on half duplex serial transmission, controlled by a UART within the control logic, which can operate at 31.25 Kbps. The main difference electrically, for PROFIBUS and H1 FF, is in the gender and connections for the connector. CANBUS implements a Synchronous Peripheral Interface (SPI) port via UT2 to the interface driver, reassigning the option pins for select (NCS input on UT2), clock (SCK input on UT2), and data flow SI and SO on UT2). Furthermore, UT2 maps the TXD and RXD signals to the TXD, RXD signals respectively on UT3. Signal I/O1 is output to the termination section T. UT3 inputs further include a reference timer Rs and a reference voltage Vref, a floating supply voltage $V_{BS}$ and a control voltage $V_{CO}$.

As described herein, termination of the bus is also provided in the circuit 300. Termination requires that a circuit connects and disconnects with the termination resistors that are used for transmission line termination as now described. When a module containing the circuit 300 is attached to a fieldbus along with other modules along the bus, terminations are required for the ends of the bus and disconnected for modules connected within the middle of the bus. The relay K1 allows connection of the termination array of resistors RT1, RT2, and RT3 allowing for pull up, parallel, and pull down termination, for example.

As feedback that the relay is disconnecting the termination from the bus, resistors RT6 and RT7 allow for the OPTION6 signal to be pulled low when the relay K1 is connecting the termination and pulled high when K1 is disconnecting the termination. Control of relay K1 is implemented via the transistor QT, driven either by OPTION5 (PROFIBUS or H1 FF using the same transceiver UT1) or an I/O1 signal from the CAN interface UT2. As such, relay K1 can be a dual pole dual throw (DPDT) relay, compared to a three pole relay with separate feedback switch requiring a more expensive relay, thereby reducing cost of the circuit 300.

As will be appreciated by one skilled in the art, aspects of the present invention, such as instructions to generate appropriate information flow and to drive the configurable lines differently as part of one program with different code branches or different programs loaded at the time of manufacture to match hardware as configured (e.g., in the FPGA controller section 135), may be embodied as a system, method or computer program product to provide the control and functionality of the signals depending on the selected interface. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Technical effects include reduced costs due to implementation of a common circuit board to house the basic sections and components of multiple interface types. Reduction of manufacturing and hardware development costs through the combining of functions on a shared circuit board layout. By use of a common circuit board, higher quantities lead to lower overall cost through volume manufacturing.

The exemplary embodiments described herein further include programmable bus termination enabling changes in control signals via firmware. The exemplary embodiments described herein further include diagnostic verification of the relay operation while using only a DPDT relay (which is less cost than a 3PDT relay). Support of multiple protocols in hardware further requires variations in termination circuits. By providing a relay switch and termination resistor network, differences in protocols can be provided by bill of material changes (varying both removal and/or insertion of and value of resistors). The relay switching also allows for the location of the module along the fieldbus, where endpoints require termination to be connected and mid-cable connections require the termination to be disconnected. Where past implementations have required user set jumpers or switches for selecting the termination, the exemplary embodiments described herein implement a relay under control of the module internal settings (often supplied by another interface such as Ethernet or control panel settings).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An interface circuit board apparatus, comprising:
a shared circuit board base;
a transceiver section disposed on the circuit board base, and having circuit transceiver sites to receive a plurality of transceiver component types;
a termination section disposed on the circuit board base, and having circuit termination sites to receive a plurality of termination component types;

a connection section operatively coupled to the transceiver and termination sections; and a section of manually configurable jumpers disposed between the termination section and connection section, the manually configurable jumpers being set at a time of manufacture to support signal mapping for particular connection types, wherein the transceiver section, the termination section and the section of manually configurable jumpers include electrical connection sites to support a plurality of interface types based on the plurality of transceiver component types and the plurality of termination component types, such that a first set of transceiver components and termination components are mounted to the transceiver section and the termination section to support a first interface type, and a second set of transceiver components and termination components are mounted to the transceiver section and the termination section to support a second interface type, the second set of transceiver components and termination components being different from the first set of transceiver components and termination components.

2. The apparatus as claimed in claim 1 wherein the section of manually configurable jumpers is further disposed between the transceiver section and the connection section.

3. The apparatus as claimed in claim 1 wherein the section of manually configurable jumpers provides electrical connections to route interface signals to a connector disposed in the connection section.

4. The apparatus as claimed in claim 3 wherein the section of manually configurable jumpers includes jumper connection sites to support the plurality of interface types, each of the multiple interface types having a unique signal mapping to the connector.

5. The apparatus as claimed in claim 1 wherein the transceiver section and the termination section include electrical connections to receive a plurality of controller signal inputs, each of the controller signal inputs having a unique configuration based on a selected interface type of the plurality of interface types.

6. The apparatus as claimed in claim 1 wherein the termination section includes electrical connections to support a plurality of termination types for the plurality of interface types.

7. The apparatus as claimed in claim 6 wherein the termination section includes a plurality of termination resistors to support termination for each of the plurality of interface types.

8. The apparatus as claimed in claim 7 wherein the termination section includes a relay located between the termination resistors and the connection section to connect the all of the termination resistors with the connection section based on the relay being closed.

9. The apparatus as claimed in claim 1 wherein the transceiver section includes electrical connections to support one or more transceiver types corresponding to the plurality of interface types.

10. A fieldbus interface circuit board system, comprising:
a shared circuit board base, including:

a transceiver section disposed on the circuit board base, and having circuit transceiver sites to receive a plurality of transceiver component types;

a termination section disposed on the circuit board base, and having circuit termination sites to receive a plurality of termination component types;

a connection section operatively coupled to the transceiver and termination sections;

a section of manually configurable jumpers disposed between the termination section and connection section, the manually configurable jumpers being set at a time of manufacture to support signal mapping for particular connection types; and a controller operatively coupled to the circuit board base and having instructions to implement signals and protocols for a plurality of interface types, wherein a first set of transceiver components and termination components are mounted to the transceiver section and the termination section to support a first interface type, and a second set of transceiver components and termination components are mounted to the transceiver section and the termination section to support a second interface type, the second set of transceiver components and termination components being different from the first set of transceiver components and termination components.

11. The system as claimed in claim 10 wherein the section of manually configurable jumpers is further disposed between the transceiver section and the connection section.

12. The system as claimed in claim 10 wherein the section of manually configurable jumpers provides electrical connections to route interface signals to a connector disposed in the connection section based on a selected interface type of the plurality of interface types.

13. The system as claimed in claim 12 wherein each of the multiple interface types includes a unique signal mapping to the connector.

14. The system as claimed in claim 10 wherein the transceiver section and the termination section include electrical connections to receive a plurality of controller signal inputs, each of the controller signal inputs having a unique configuration based on a selected interface type of the plurality of interface types.

15. The system as claimed in claim 10 wherein the termination section includes electrical connections to support a plurality of termination types for the plurality of interface types.

16. The system as claimed in claim 15 wherein the termination section includes a plurality of termination resistors to support termination for each of the plurality of interface types.

17. The system as claimed in claim 16 wherein the termination section includes a relay between the termination resistors and the connection section to connect all of the termination resistors with the connection section based on the relay being closed.

18. The system as claimed in claim 10 wherein the transceiver section includes electrical connections to support one or more transceiver types corresponding to the plurality of interface types.

* * * * *